United States Patent [19]

Esper et al.

[11] Patent Number: 4,613,843
[45] Date of Patent: Sep. 23, 1986

[54] PLANAR COIL MAGNETIC TRANSDUCER

[75] Inventors: Michael J. Esper, Farmington Hills; Russell J. Haeberle, Plymouth; Brian G. Winegar, Howell, all of Mich.

[73] Assignee: Ford Motor Company, Dearborn, Mich.

[21] Appl. No.: 663,523

[22] Filed: Oct. 22, 1984

[51] Int. Cl.$^4$ .......................... H01F 27/28; G01B 7/14
[52] U.S. Cl. ..................................... 336/232; 336/200; 336/180; 336/155; 324/208
[58] Field of Search ............... 336/110, 155, 180, 196, 336/200, 232; 310/155; 324/173, 174, 208

[56] References Cited

U.S. PATENT DOCUMENTS

| | | | |
|---|---|---|---|
| 3,549,825 | 12/1970 | Trimble | 336/232 X |
| 4,166,977 | 9/1979 | Glauert et al. | 324/173 |
| 4,293,814 | 10/1981 | Boyer | 324/208 X |
| 4,319,188 | 3/1982 | Ito et al. | 324/208 X |
| 4,392,013 | 7/1983 | Ohmura et al. | 336/200 X |

Primary Examiner—Arthur T. Grimley
Assistant Examiner—C. Romano
Attorney, Agent, or Firm—Peter Abolins; Robert D. Sanborn

[57] ABSTRACT

A planar magnetic transducer uses thin film technology to form a coil on a ceramic substrate. A relatively powerful magnet is positioned adjacent the substrate so a changing magnetic reluctance adjacent to the coil can be detected by a voltage change at the coil.

2 Claims, 6 Drawing Figures

U.S. Patent  Sep. 23, 1986  Sheet 1 of 3  4,613,843
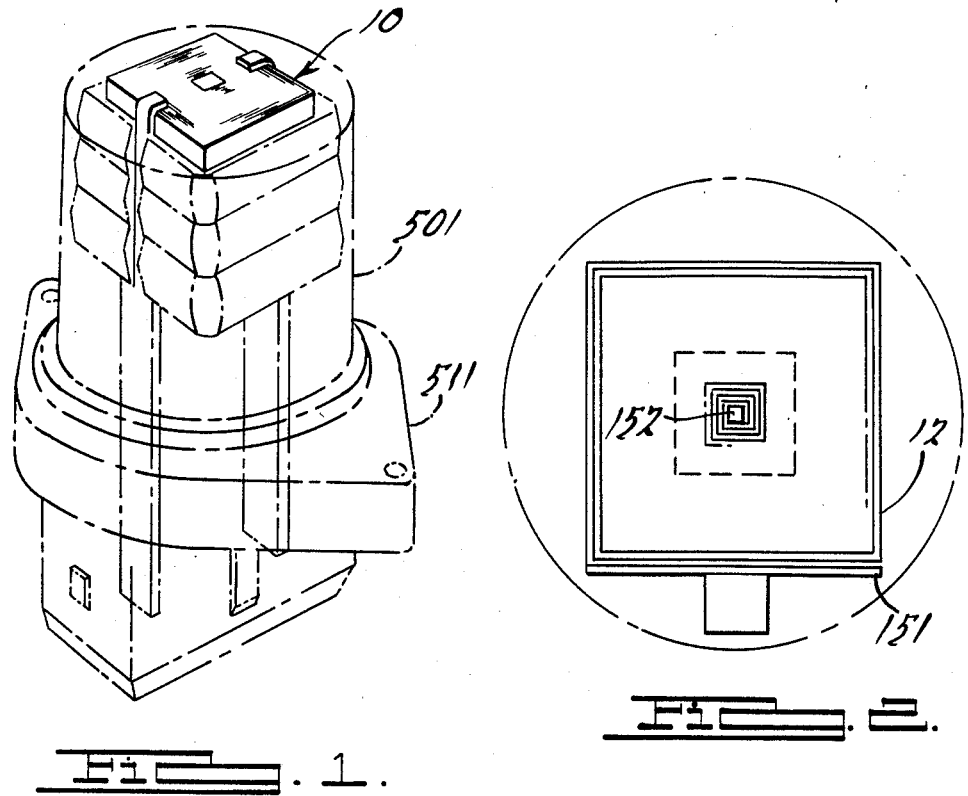
FIG. 1.
FIG. 2.
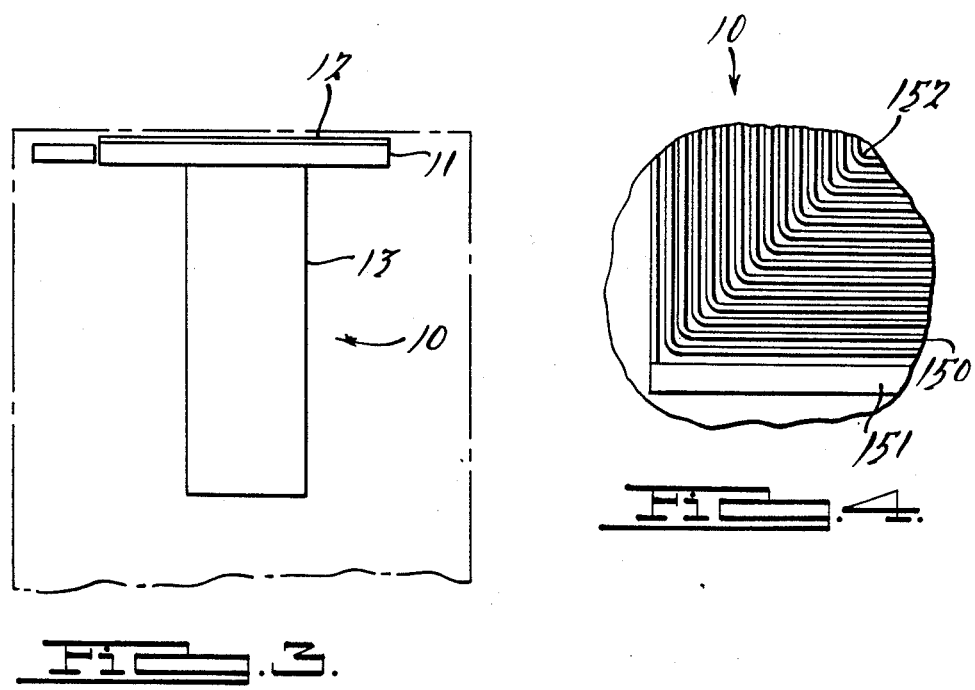
FIG. 3.
FIG. 4.

PLANAR COIL MAGNETIC TRANSDUCER

BACKGROUND OF THE INVENTION

1. Field of the Invention

This invention relates to magnetic transducers for use in sensing speed or position.

2. Prior Art

Various crankshaft position sensors are known for engine speed measurement and control of ignition timing in an internal combustion engine. Typically, the sensor provides an output signal based on movement of a crankshaft pulse ring. For example, the crankshaft sensor can include a permanent magnet and a wound wire coil mounted adjacent the crankshaft pulse ring to sense changing magnetic flux. When the crankshaft rotates, individual pulse ring lobes from the crankshaft pulse ring approach, align with and then pass the crankshaft sensor. As the metal lobes pass through the sensor's magnetic field, the field distortion which occurs causes the turns of the wire coil to be cut by magnetic flux, or the coil to be threaded by the magnetic flux, so as to generate a voltage output signal of crankshaft position which can be used by an engine control computer. Sensor voltage increases, then sharply decreases and returns to base level, each time a lobe crosses the sensor's magnetic field. The computer interprets the pulses of voltage inputs as crankshaft position for spark timing. It can also decode engine speed information for spark advance calculation.

To provide a sensor output of adequate magnitude, many coil turns are required. Producing such a wound wire coil with associated electrical terminations is relatively expensive and time consuming. It would be desirable to reduce cost and to produce a sensor using high volume batch processing fabrication techniques.

U.S. Pat. No. 3,549,825 issued to Trimble teaches a magnetic transducer for use in magnetic recording and reproduction. The coil structure disclosed in this patent is a relatively complicated structure requiring about sixty-one distinct processing steps. Several are critical steps which could result in overetching or overabrading. A sputter deposited coil is fabricated in the general shape of a spiral with at least a portion of the coil being sandwiched between the pole ends of two magnetic circuit plates. The goals of this design are high resolution and high switch rate capability so that the transducer is able to orient or sense magnetic domains on a recording disc or tape surface rotating at high speed. In an automotive application to sense crankshaft position, much higher signal levels would be required from the transducer element, in a much more harsh operating environment. The positioning of the sensor adjacent the crankshaft cannot be as close as the positioning of a recording head to the recording disc or tape surface. As a result, the magnetic field intensity and extension into the gap between the sensor and the crankshaft must both be much greater for the automotive application than for the recorder read-write head. The magnetic field generated by powering up the tiny coil would be inadequate for the automotive application and the sensor must provide a strong magnetic field with a permanent magnet.

U.S. Pat. No. 4,166,977 issued to Glauert et al teaches a rotary speed and angular position determination system used for the crankshaft of an internal combustion engine. This patent generally teaches the sensing element as being one of a number of alternatives including coils, Hall generators, field responsive diodes, field responsive chips or the like. It does not teach a planar coil sensor structure or method of making such a structure. It would be desirable to have a low cost, batch produced magnetic transducer suitable for automotive lobe, gear tooth, or gap sensing applications.

SUMMARY OF THE DISCLOSURE

This invention teaches a magnetic transducer having a thin film, fine line conductive coil placed on a high resistivity substrate adjacent to a relatively high strength magnet. The generally planar high resistivity substrate has a first major planar surface supporting the coil and an opposing second major planar surface. The magnet is positioned adjacent the second surface on the opposite side of the substrate from the thin film conductive coil.

A relatively strong magnet is used so that the device is sensitive enough to pick up magnetic field variations due to individual gear teeth at air gaps, much larger than the 0.0001 inch gap typical of disc drives. Thin film coils are inherently easier to protect against electrical short circuiting of the turns because, when applied, the coil insulation is not damaged by flexing, twisting, or scraping as is the wire insulation during the winding operation for wound coils. The construction of a sensor in accordance with an embodiment of this invention provides an advantageous combination of signal level, signal resolution, sensor cost and reliability. In comparison to a wound coil design, the planar coil detects smaller flux movements because the density of coil turns for the single plane coil is higher than the density of coil turns for any one plane in the three dimensional larger wire wound coil. This results in a higher sensitivity per plane. The all metal sensing element and metal-metal interconnections at the coil terminations are desirable for automotive applications where the environmental temperatures may reach 150° C.

BRIEF DESCRIPTION OF THE DRAWING

FIG. 1 is a perspective view of a package assembly including a magnetic transducer in accordance with an embodiment of this invention;

FIG. 2 is a plan view of a magnetic transducer in accordance with an embodiment of this invention;

FIG. 3 is a side elevational view of a magnetic transducer in accordance with an embodiment of this invention;

FIG. 4 is an enlarged view of a portion of FIG. 2;

DETAILED DESCRIPTION OF THE INVENTION

Figure 5:
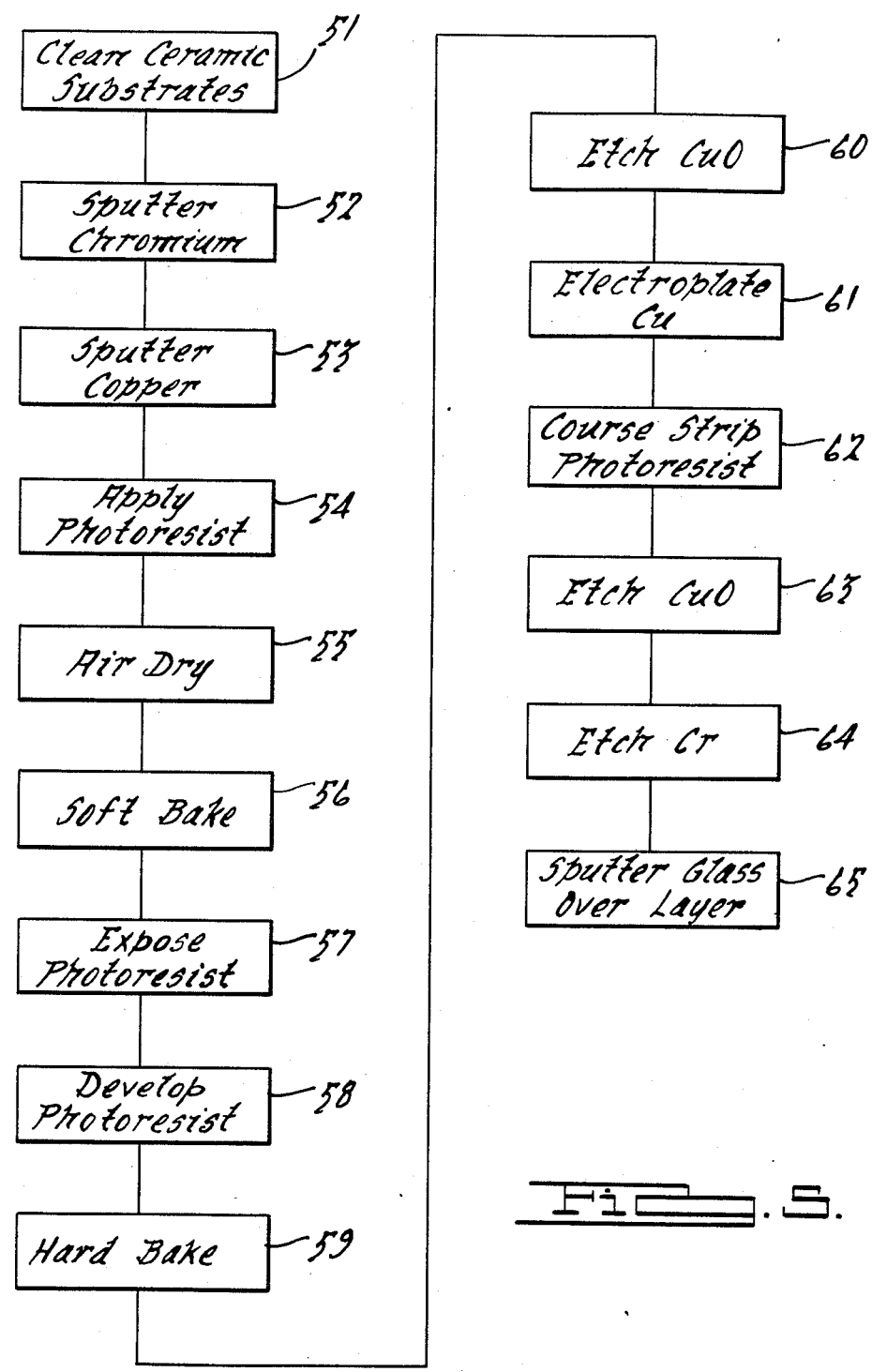
FIG. 5 is a block diagram of the steps used in fabricating a magnetic transducer in accordance with an embodiment of this invention.

Referring to FIGS. 1, 2 and 3, a magnetic transducer 10 includes a substrate 11 on one side of which is formed a planar coil 12. A magnet 13 is attached to the other side of the substrate 11 from planar coil 12. A rotating toothed crankshaft position gear (not shown) rotates adjacent magnetic transducer 10. The gap between the rotating wheel and magnetic transducer 10 is sufficiently small (typically 0.080 inch) so that the passage of a gear tooth near transducer 10 causes a magntic field disturbance changing the voltage output from planar coil 12.

Planar coil 12 has relatively fine lines (typically 5 micron width lines and 5 micron spacing between lines with a height in the range of about one to three microns) which are relatively tightly packed so that small flux variations cause a desirably large voltage output. Advantageously, planar coil 12 is oriented so that flux cutting the plane of coil 12 approaches a 90° angle. This maximizes the voltage output of planar coil 12 for a given air gap, coil design, magnet material and design, and flux velocity, which is a function of the linear velocity of the pulse wheel passing the sensor head.

To achieve the desired signal amplitude, magnet 13 is typically strong enough to create a flux linkage between transducer 10 and the rotating teeth at the working air gap. Typically, a rare earth or Alnico magnet is used to extend the magnetic flux into the air gap. A high residual induction ($B_r$) and coercive force ($H_c$) magnet provides a high concentration of magnetic flux in the air gap. The flux concentration in the space beyond the magnet pole surface increases with both $B_r$ and the magnet's magnetomotive force ($F=H_c l$), wherein $H_c$ equals coercive force and l equals magnet length. This decreases sensitivity to normal gear and engine production tolerances causing a variation in the gap.

Referring to FIG. 1, magnetic transducer 10 is packaged in a holder 501 which has a mounting base 511 for attaching holder 501 to a support adjacent the rotating toothed gear. Holder 501 provides for electrical connection to magnetic transducer 10 which is mounted at the end of holder 501 opposite from base 511.

Referring to FIG. 4, magnetic transducer 10 has a continuous coil conducting path 150 forming generally concentric, nested rectangular portions of decreasing size. At the outermost extremity of the coil conducting path, an elongated connection pad 151 is formed along one edge of the square. At the innermost portion of the conducting path, a generally square connector pad 152 (see FIG. 2) provides electrical connection to the innermost portion of the spiral.

The steps for fabrication of magnetic transducer 10 are shown in FIG. 5. Starting at a block 51, a ceramic substrate is first cleaned. At block 52, chromium is sputtered on the ceramic substrate. Then copper is sputtered on top of the chromium and a photo resist is applied (blocks 53 and 54). The structure is then air dried (block 55) and exposed to a baking heat (block 56). The photo resist is then exposed (block 57) and developed (block 58). After developing, the photoresist pattern is hard baked (block 59). This improves the adhesion of the photoresist to the metallized surface. In block 60, the exposed copper surface is bright etched to provide a fresh metal surface for electroplating. Additional copper is then electroplated on the exposed copper (block 61) and the remaining photo resist is removed in a solvent dip process (block 62). The exposed thin film copper is then etched away (block 63) and the subsequently exposed chromium is etched (block 64). A passivating glass film may be sputtered on top of the structure (block 65) or alternately a polymer film may be applied.

Figure 6:
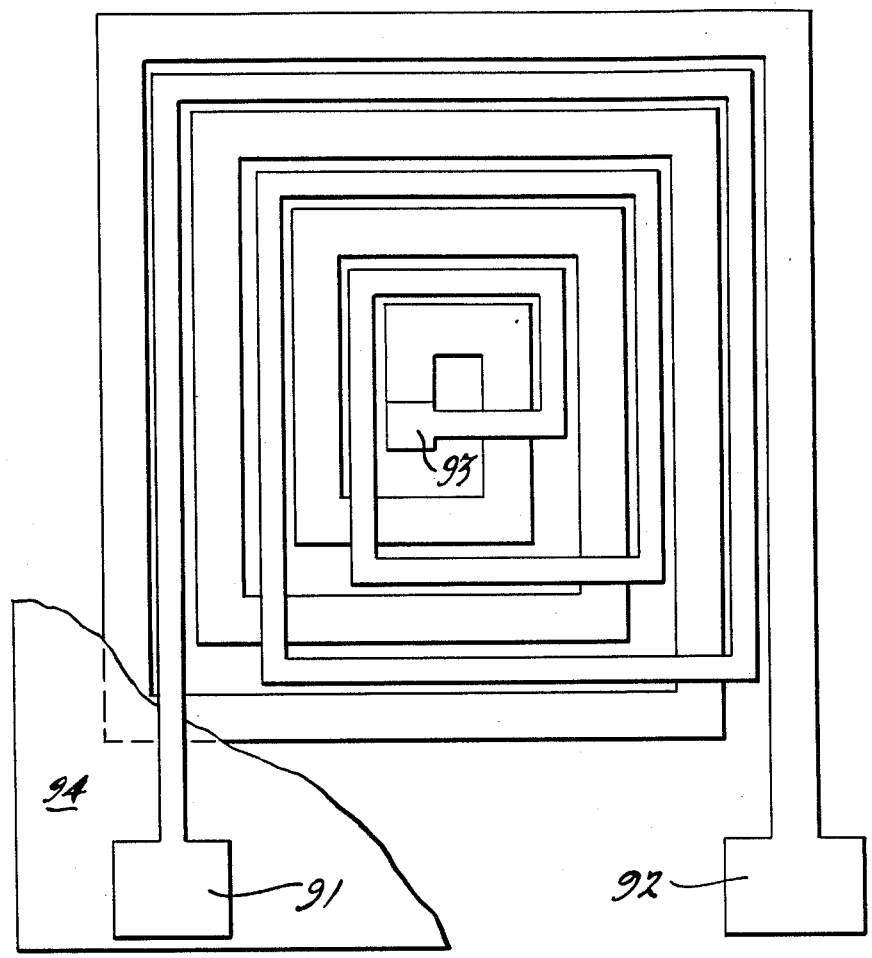
FIG. 6 is a plan view of a two layer coil structure capable of providing a higher output signal level, in accordance with an embodiment of this invention.

As a result of the above steps, the resulting planar coil thickness is built up during the electroplating step at block 61 and a portion of that was removed when the copper between the coil lines was removed in the etching step of block 63. If it is desired to increase the number of turns, it is possible to put a passivating layer on top of the first fabricated coil and then form a second coil above the first and connected with the first at the center. A plan view of the coils of such a structure is shown in FIG. 6. A top coil 91 is coupled to a bottom coil 92 by an interconnection 93 extending through a passivating layer 94 insulating coils 91 and 92 from each other.

Typical coil dimensions are 9.3 millimeters by 9.2 millimeters, 524 turns. Typical magnet dimensions are 3.6 millimeters by 3.6 millimeters by 10 millimeters. Such a structure can produce an output voltage at 30 revolutions per minute greater than 10 millivolts peak. A typical inductance is 1.95 millihenries. The smallest turn is about 0.6 millimeters by 0.6 millimeters while the largest turn in the coil is about 9.0 millimeters by 9.0 millimeters. The line width of the coil is about 4 microns. The length of the conductive path of the coil in such a structure is about 10.0493 meters.

In another embodiment, the coil can have 660 turns, with each turn being about 2 microns high and 2 microns wide. The magnet can be a Hicorex 99B rare earth cobalt magnet having dimensions of 10 millimeters by 10 millimeters by 3.6 millimeters. Substrate 11 can be of a ceramic material.

In operation, magnetic transducer 10 produces a sine wave output and is coupled to an output circuit which generates a square wave. The rising edge of the output square wave is triggered by some specified positive voltage output of transducer 10. The falling edge of the square wave corresponds to the zero crossing of the sine wave transducer output.

Various modifications and variations will no doubt occur to those skilled in the various arts to which this invention pertains. For example, the particular connecting terminals to the coil may be varied from that disclosed herein. These and all other variations which basically rely on the teachings through which this disclosure has advanced the art are properly considered within the scope of this invention.

We claim:
1. A magnetic transducer comprising:
a generally planar high resistivity substrate having a first major planar surface and an opposing second major planar surface;
a generally planar first coil having one side secured to said first major planar surface of said substrate;
a magnet positioned adjacent said second surface on the opposite side of said substrate from said generally planar first coil;
said planar first coil including an inwardly winding conductive path from an outside connection terminal to an inside connection terminal;
said first coil being copper formed on chromium;
said substrate being formed of a ceramic material;
said conductive path being formed of a plurality of connected conductive runs, each conductive run having a generally rectangular boundary and successively nested within one another, each conductive run having a width of about 5 microns, a spacing of about 5 microns, from an adjacent coil conductive run, and a height in the range of about 1 to 3 microns;
a non-conducting passivating layer formed on said planar first coil;
a generally planar second conductive coil having one side secured to said passivating layer on the side opposite from said first coil;

a conductive interconnection extending through said passivating layer between said first and second coils; and said second conductive coil being formed of a plurality of connected conductive runs, each conductive run having a generally rectangular boundary and successively nested within one another.

2. A magnetic transducer as recited in claim 1 wherein said magnet is a rare earth magnet.

* * * * *